United States Patent [19]

Le Fol et al.

[11] Patent Number: 4,893,797

[45] Date of Patent: Jan. 16, 1990

[54] HYDROELASTIC SUPPORT, IN PARTICULAR FOR THE SUSPENSION OF A MOTOR IN A VEHICLE

[75] Inventors: Marcel Le Fol, Chateaugiron; Pascal Robic, Guignen, both of France

[73] Assignees: Automobiles Peugeot, Paris; Automobiles Citroen, Neuilly, both of France

[21] Appl. No.: 215,516

[22] Filed: Jul. 6, 1988

[30] Foreign Application Priority Data

Jul. 7, 1987 [FR] France ................................. 87 09650

[51] Int. Cl.$^4$ ............................................. F16F 13/00
[52] U.S. Cl. ................................ 267/140.1; 180/300;
180/312; 248/562; 248/636
[58] Field of Search ..................... 267/140.1, 219, 220;
248/636, 562; 180/300, 312, 902

[56] References Cited

U.S. PATENT DOCUMENTS

| | | |
|---|---|---|
| 2,226,388 | 12/1940 | Richter . |
| 2,387,066 | 10/1945 | Harding . |
| 2,540,130 | 2/1951 | Lee . |
| 2,562,195 | 7/1951 | Lee . |
| 2,926,881 | 3/1960 | Painter . |
| 3,013,920 | 12/1961 | Harris et al. . |
| 3,154,273 | 10/1964 | Paulsen . |
| 3,202,388 | 8/1965 | Goodwin . |
| 3,586,403 | 6/1971 | Cooley . |
| 3,642,268 | 2/1972 | Hipsher . |
| 3,651,902 | 3/1972 | Peddinghaus . |
| 3,698,703 | 10/1972 | Hipsher . |
| 3,731,771 | 5/1973 | Borgo . |
| 3,795,390 | 3/1974 | Kendall et al. . |
| 3,958,654 | 5/1976 | LeSalver et al. . |
| 3,970,162 | 7/1976 | LeSalver et al. . |
| 4,054,277 | 10/1977 | Sirven . |
| 4,159,091 | 6/1979 | LeSalver et al. . |
| 4,191,398 | 3/1980 | Willetts . |
| 4,211,429 | 7/1980 | Howard . |
| 4,215,842 | 8/1980 | Brenner et al. . |
| 4,262,886 | 4/1981 | LeSalver et al. . |
| 4,274,655 | 6/1981 | Lederman . |
| 4,277,056 | 7/1981 | Ticks . |
| 4,319,768 | 3/1982 | Youngdale . |
| 4,336,968 | 6/1982 | Hibner . |
| 4,389,045 | 6/1983 | Taylor . |
| 4,422,779 | 12/1983 | Hamaekers et al. . |
| 4,469,316 | 9/1984 | van den Boom et al. . |
| 4,510,818 | 4/1985 | Inui . |
| 4,519,211 | 5/1985 | Sedille et al. . |
| 4,568,069 | 2/1986 | Poupard . |
| 4,573,656 | 3/1986 | Yoshida et al. . |
| 4,588,173 | 5/1986 | Gold et al. . |
| 4,603,844 | 8/1986 | Chen . |
| 4,630,803 | 12/1986 | Werner et al. . |
| 4,657,232 | 4/1987 | West . |
| 4,673,156 | 6/1987 | Tabata . |
| 4,679,777 | 7/1987 | Gold et al. . |
| 4,679,778 | 7/1987 | Tabata et al. . |
| 4,688,662 | 8/1987 | Correll . |
| 4,702,346 | 10/1987 | Uno et al. . |
| 4,705,410 | 11/1987 | von Broock . |
| 4,720,086 | 1/1988 | LeSalver et al. . |
| 4,733,854 | 3/1988 | Miyamoto . |
| 4,738,434 | 4/1988 | Marjoran et al. ............... 248/562 X |
| 4,767,106 | 8/1988 | Le Fol . |
| 4,767,107 | 8/1988 | Le Fol . |
| 4,768,760 | 9/1988 | Le Fol . |

FOREIGN PATENT DOCUMENTS 0005730 11/1979 European Pat. Off. .

(List continued on next page.)

OTHER PUBLICATIONS

Report "Theory of the Hydraulically Damped Motor Mount with a Long Nozzle".

(List continued on next page.)

Primary Examiner—George E. A. Halvosa
Attorney, Agent, or Firm—Burns, Doane, Swecker & Mathis

[57] ABSTRACT

The support is so arranged as to have a wider damping characteristic. For this purpose, it comprises two expansion chambers connected to the same work chamber by ducts having different characteristics so that the liquid contained in these ducts is put into resonance at different frequencies. The two expansion chambers are disposed concentrically to each other on the same side of the work chamber and are defined by a separating partition and by a single diaphragm.

8 Claims, 3 Drawing Sheets

FOREIGN PATENT DOCUMENTS

| | | |
|---|---|---|
| 0014742 | 9/1980 | European Pat. Off. . |
| 0027751 | 4/1981 | European Pat. Off. . |
| 0036470 | 9/1981 | European Pat. Off. . |
| 0044908 | 2/1982 | European Pat. Off. . |
| 0054776 | 6/1982 | European Pat. Off. . |
| 0072262 | 2/1983 | European Pat. Off. . |
| 0091246 | 10/1983 | European Pat. Off. . |
| 0139261 | 5/1985 | European Pat. Off. . |
| 0147242 | 7/1985 | European Pat. Off. . |
| 0148387 | 7/1985 | European Pat. Off. . |
| 0149080 | 7/1985 | European Pat. Off. . |
| 0154268 | 9/1985 | European Pat. Off. . |
| 0163817 | 12/1985 | European Pat. Off. . |
| 0220465 | 9/1986 | European Pat. Off. . |
| 0209883 | 1/1987 | European Pat. Off. . |
| 0213324 | 3/1987 | European Pat. Off. . |
| 0231898 | 8/1987 | European Pat. Off. . |
| 0242254 | 12/1987 | European Pat. Off. . |
| 547194 | 2/1934 | Fed. Rep. of Germany . |
| 728501 | 11/1942 | Fed. Rep. of Germany . |
| 1124832 | 3/1962 | Fed. Rep. of Germany . |
| 1625389 | 7/1970 | Fed. Rep. of Germany . |
| 7407909 | 5/1977 | Fed. Rep. of Germany . |
| 2948408 | 6/1981 | Fed. Rep. of Germany . |
| 0071698 | 2/1983 | Fed. Rep. of Germany . |
| 3245653 | 6/1984 | Fed. Rep. of Germany . |
| 3414547 | 10/1985 | Fed. Rep. of Germany . |
| 3610611 | 10/1987 | Fed. Rep. of Germany . |
| 926846 | 4/1947 | France . |
| 1189778 | 3/1959 | France . |
| 1242350 | 8/1960 | France . |
| 1336186 | 7/1963 | France . |
| 1380784 | 10/1964 | France . |
| 1540380 | 8/1968 | France . |
| 1549300 | 11/1968 | France . |
| 2332151 | 6/1977 | France . |
| 2349066 | 11/1977 | France . |
| 2394715 | 1/1979 | France . |
| 2435632 | 4/1980 | France . |
| 2547378 | 6/1984 | France . |
| 2555272 | 11/1984 | France . |
| 2555688 | 5/1985 | France . |
| 56-143830 | 11/1981 | Japan . |
| 59-11731 | 7/1982 | Japan . |
| 58-72741 | 4/1983 | Japan . |
| 59-37348 | 2/1984 | Japan . |
| 59-183565 | 10/1984 | Japan . |
| 59-231233 | 12/1984 | Japan . |

OTHER PUBLICATIONS

Report comparing Motor Mounts (with English translation).
Drawing dated Oct. 5, 1979 with attachements.
Freudenberg drawing 10780 dated Nov. 5, 1979.
"The Use of Engine Mounts with Integrated Hydraulic Damping in Passenger Cars", presented by Le Salver, 1983.

HYDROELASTIC SUPPORT, IN PARTICULAR FOR THE SUSPENSION OF A MOTOR IN A VEHICLE

The present invention relates to hydroelastic supports employed in particular for the suspension of a motor in an automobile vehicle.

There is known, in particular from the patent FR-A-No. 7 926 137, a support comprising two armatures adapted to be connected, one to the motor and the other to the structure of the vehicle, these two armatures being connected by a block of elastomeric material which partly defines a work chamber. The latter, which is filled with hydraulic liquid, is connected through a duct to an expansion chamber which is also filled with liquid. The connecting duct between the two chambers is generally defined by a partition carried by one of the two armatures and which separates the work chamber from the expansion chamber.

This partition may also include a part which is movable in a direction perpendicular to its mean plane, this movable part being movable through a relatively small distance on the order of a few tenths of a millimetre.

In such a support, the maximum damping achieved when the column of liquid contained in the duct connecting the work chamber to the expansion chamber is put into resonance. This resonance is produced for a frequency of given value, so that, outside a zone on each side of this value, the damping produced by the support may be found to be insufficient.

An object of the invention is to provide a hydroelastic support which in fact affords large damping characteristics within a frequency range which is wider than that of the known supports, while it is simple and compact in construction.

The invention therefore provides a hydroelastic support comprising two armatures interconnected by a block of elastomeric material, a work chamber defined partly by the block of elastomeric material, a first expansion chamber connected by a first duct to the work chamber, at least one second expansion chamber, isolated from the first chamber and connected to the work chamber by a second duct having characteristics of length and/or section which are different from those of the first duct, said various chambers being filled with liquid, the expansion chambers disposed on the same side of the work chamber being separated from the work chamber by a rigid partition carried by one of the armatures and in which the ducts are at least partly defined, wherein the expansion chambers are defined by said partition and by a single diaphragm.

According to other features of the invention:

said diaphragm has a thickness which is different in each of its parts defining the respective expansion chambers;

the two expansion chambers are disposed concentrically and the support comprises means for applying in a sealed manner an intermediate part of the diaphragm against the partition.

The invention will be described in more detail hereinafter with reference to the accompanying drawings which are given solely by way of examples and in which.

Figure 1:
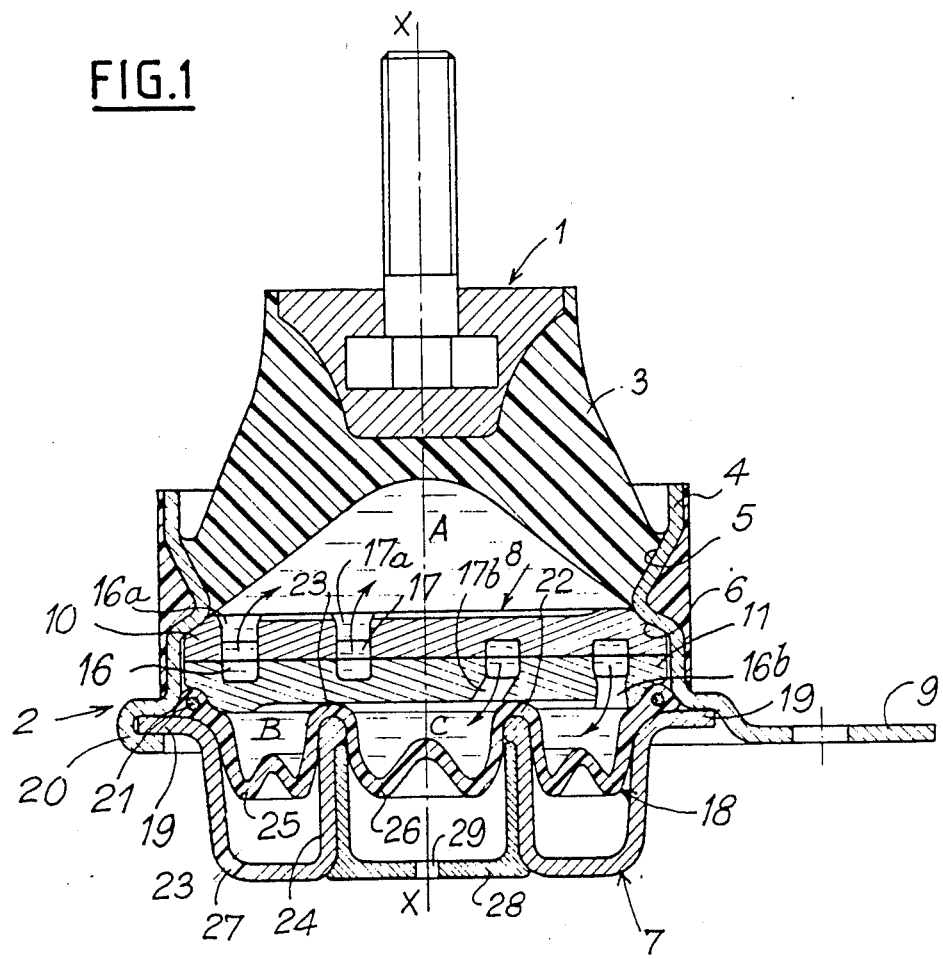
FIG. 1 is a sectional view taken on line 1—1 of FIG. 2 of a support according to the invention.
Figure 2:
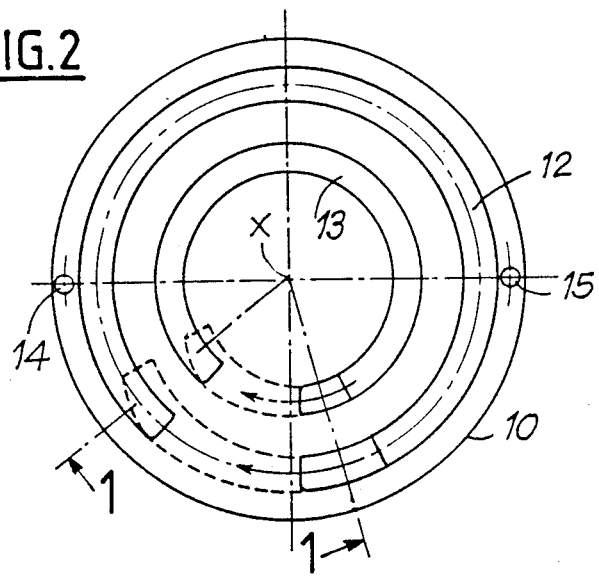
FIG. 2 is a top plan view of an element which is part of the construction of this support.

Shown in FIGS. 1 and 2 is a hydroelastic support which may be incorporated between a motor and the structure of an automobile vehicle. For this purpose, such a support comprises a first armature or frame 1 adapted to be fixed to one of the two sub-assemblies to be interconnected, and a second armature or frame 2 adapted to be connected to the other of these two sub-assemblies. These two armatures are interconnected by a block of elastomeric material 3 which is bonded or vulcanized to the confronting parts of the two armatures.

With the axis of the support designated X—X, the second armature 2 comprises a roughly axial portion 4 which is so shaped as to define two surfaces 5, 6 which are inclined relative to the axis X—X. The first surface 5 facing toward the first armature receives the block of elastomeric material, and the other surface 6, facing toward a cover 7, participates in the maintenance of a partition 8. The armature 2 further comprises radial lugs for fixing it to the adjacent sub-assembly.

The partition 8 is here in the form of two identical plates 10, 11, each having two channels 12, 13 formed in one of their sides, these concentric channels extending in a notable part of the circumference and opening onto the opposite side of the plate in the vicinity of one of their ends. Each of the two plates includes on the side in which the channels are provided a stud 14 and a cavity 15 which are diametrically opposed so that they may be assembled as shown in FIG. 1 and define channels or ducts 16, 17 which open out at their two ends respectively at 16a, 17a and 16b, 17b, on each side of the partition constituted by the two plates. FIG. 2 shows a bottom view of the plate 10.

The plates and a diaphragm 18 of flexible material are fixed and maintained in position between the surface 6 of the armature 2 and a roughly radial flange 19 of the cover 7 which is maintained on the armature by a forming over or setting operation, as shown at 20. thermoplastic material, steel or other relatively rigid material which ensures its maintenance when carrying out the forming-over operation. The diaphragm 18 is corrugated a corrugation 22 thereof being applied in sealed contact against the adjacent side of the partition 8 by the rounded edge 23 of an annular skirt 24 constituted by the cover 7. The region of sealed contact between the diaphragm 18 and the partition 8 is located between the two orifices 16b, 17b through which the channels or ducts 16 and 17 open onto this same side.

The other corrugations of the diaphragm form bellows 25, 26.

The cover 7 provides a protection of the peripheral part 26 of the diaphragm and defines an orifice 27 for communicating with the open air. This cover is completed by a plug 28 which is also provided with a venting orifice 29 and protects the central part 26 of the diaphragm.

The mass 3 of elastomeric material, the partition 8 and the diaphragm define, on one hand, a work chamber A, and, on the other hand, two expansion chambers B and C. The expansion chamber B is connected to the work chamber through the duct 16 and the expansion chamber C is connected to the work chamber through the duct 17.

The work chamber, the expansion chambers and the ducts which interconnect them are filled with hydraulic liquid, which is an arrangement well known in this type of support.

In the illustrated embodiment, the two ducts 16 and 17 have roughly the same section but different lengths, so that the column of liquid contained in each of these ducts is put into resonance for different frequencies. As the outer column is tuned to a first frequency, the tuned frequency of the inner column is thus higher.

When the resonance of the liquid column at the lower frequency is reached, the liquid no longer circulates between the work chamber A and the corresponding expansion chamber B so that a first damping occurs. On the other hand, the liquid still circulated through the second duct, namely the inner duct 17. When the resonance corresponding to this second cut is reached, a second damping occurs.

Figure 5:
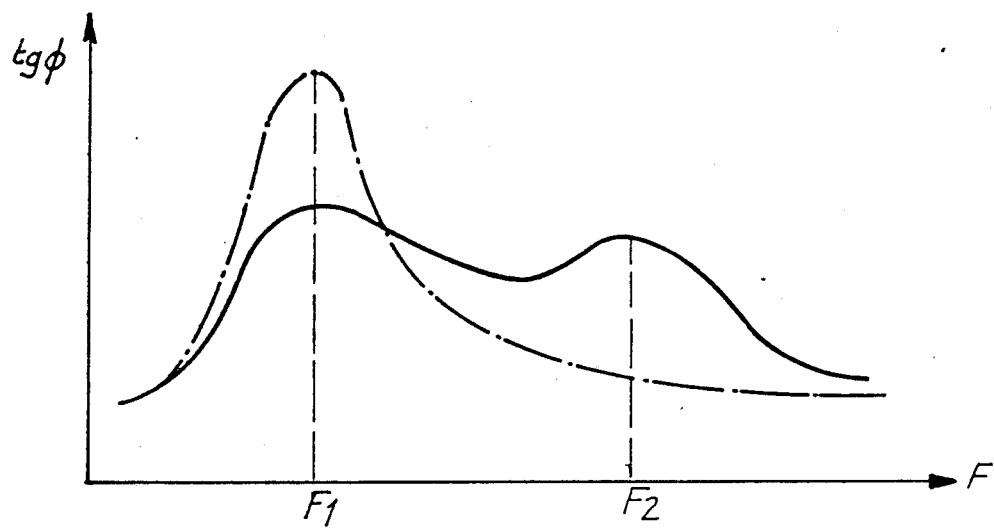

This operation is illustrated in FIG. 5, in which is shown in full lines the damping characteristics tan $\phi$ of a support according to the invention, the two crests of this curve corresponding to the two respective damping frequencies F1, F2.

Also shown in dot-dash line in this diagram is a damping curve corresponding to a conventional hydroelastic support or block which affords a much narrower damping range.

Figure 3:
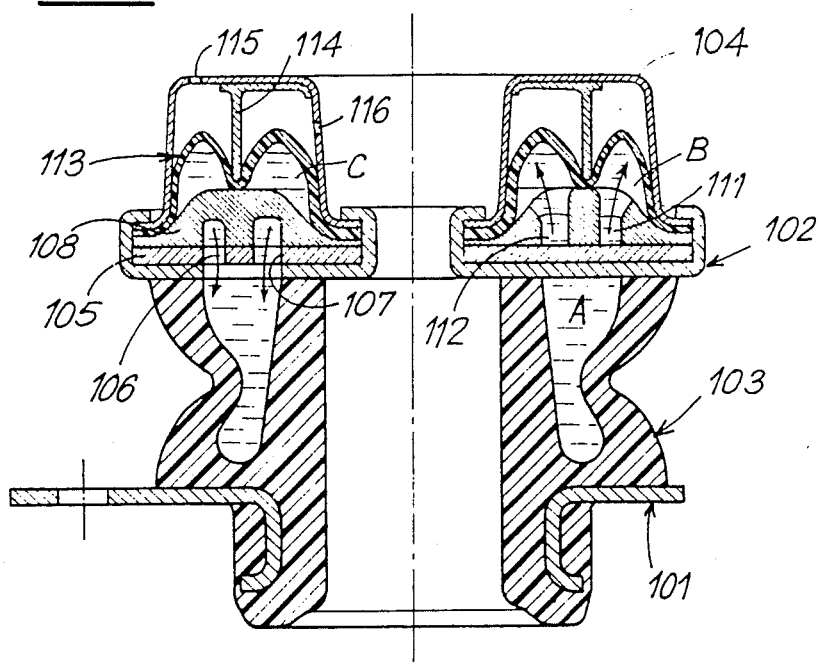
FIG. 3 is an axial sectional view taken on line 3—3 of FIG. 4.
Figure 4:
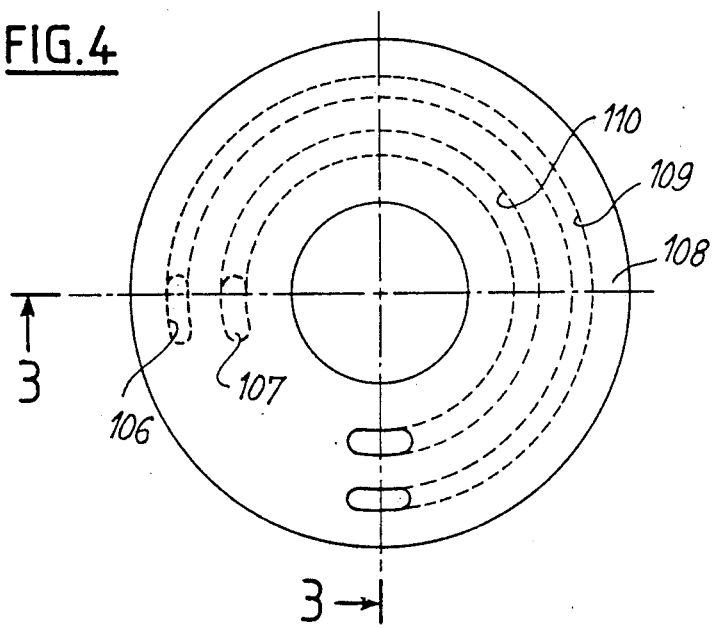
FIG. 4 is a plan view for showing the shape of the ducts connecting the work chamber to the expansion chambers, and, FIG. 5 is a diagram illustrating the damping characteristic of a support according to the invention.

FIGS. 3 and 4 show a modification in which the same general characteristic is incorporated in a hydroelastic support of the type designed to receive a member which axially extends therethrough.

Such a support comprises a first armature or frame 101 adapted to be fixed to one of the two sub-assemblies to be interconnected and a second armature or frame 102 adapted to be fixed to the other sub-assembly. These two armatures are interconnected by a mass of elastomeric material 103, these three elements having an annular shape so as to define around the axis X—X of the support a central open zone in which a fixing element (not shown) may extend. The armature 102 is formed over on its inner periphery and on its outer periphery onto two flanges of a cover 104 of annular shape and having a U-sectioned shape. Disposed and maintained in position between the cover 104 and the armature 102 are a plate 105 defining two orifices 106, 107 which are also shown in FIG. 4, a moulded member 108 defining two channels 109, 110 extending in a notable part of the circumference and opening out in the vicinity of one of their ends at 111, 112 onto the side of this element opposed to the plate 105, and a flexible diaphragm 113 of elastomeric material.

This diaphragm is applied against the member 108 in an intermediate portion of the latter, between the two orifices 111 and 112, the sealed contact between the diaphragm and this member being achieved by an annular intermediate member 114 having an L-shaped section and itself maintained by the bottom of the cover 104. The latter includes two venting orifices 115 and 116.

The support therefore comprises an annular work chamber A essentially defined by the mass of elastomeric material and the armature 102, and two expansion chambers B,C defined between the member 108 and the diaphragm 113. These two expansion chambers are connected to the work chamber by two ducts 109 and 110 of different lengths.

Such a support operates in a manner similar to that already described with reference to the embodiment shown in FIGS. 1 and 2.

According to another embodiment also shown in FIG. 3, the flexible diaphragm 113 may have a different thickness in its portions respectively defining the two expansion chambers B and C. This enables the pressure resistance of the diaphragms to be varied whereas, on the other hand, the pressure resistance of the carrying part is constant since the work chamber is unique.

It is also clear, bearing in mind the foregoing, that the sections and the lengths of the two conduits connecting the work chamber to the expansion chambers may be chosen as desired, to obtain the desired damping characteristics.

We claim:

1. A hydroelastic support comprising armatures, a block of elastomeric material interconnecting the armatures, a work chamber partly defined by the block of elastomeric material, and means defining a first expansion chamber, a first duct for connecting the expansion chamber to the work chamber, means defining at least one second expansion chamber, means for isolating the second expansion chamber from the first expansion chamber, the first and second expansion chambers being disposed concentrically, a second cut for connecting the second expansion chamber to the work chamber, the first duct and the second cut having characteristics of length and/or section, said characteristics of the second duct being different from said characteristics of the first duct, said support further comprising liquid filling said chambers, the expansion chambers being disposed on the same side of the work chamber, a rigid partition carried by one of the armatures separating the two expansion chambers, said ducts being at least partly defined in said partition, a single diaphragm defining the expansion chambers with said partition, means for applying an intermediate portion of said diaphragm against the partition in a sealed manner, and said means for applying said intermediate portion of said diaphragm against the partition includes a cover which is connected to said armature which carries the partition.

2. A support according to claim 1, wherein said diaphragm has a substantially constant thickness.

3. A support according to claim 1, wherein said diaphragm comprises portions respectively partly defining the two expansion chambers and has a thickness which is different in each of said portions of said diaphragm.

4. A support according to claim 1, wherein the cover defines a flange for applying the diaphragm against the partition.

5. A support according to claim 4, wherein the cover comprises a skirt which defines a central opening and a plug closes the central opening.

6. A support according to claim 5, wherein the cover and the plug define venting orifices in zones of the cover and plug covering the expansion chambers.

7. A support according to claim 4, wherein an intermediate member is disposed between the cover and said diaphragm for applying said intermediate portion of said diaphragm against the partition.

8. A support according to claim 4, wherein the cover defines venting orifices in zones of the cover covering the expansion chambers.

* * * * *